US012652316B2

(12) United States Patent
Arla et al.

(10) Patent No.: US 12,652,316 B2
(45) Date of Patent: Jun. 9, 2026

(54) ADJUSTMENT OF ACCESS PERMISSIONS OF USER DEVICES BASED ON CREATED ACCESS POLICIES

(71) Applicant: International Business Machines Corporation, Armonk, NY (US)

(72) Inventors: Hari Krishna Arla, Hyderabad (IN); Albee Jhoney, Bangalore (IN); Praveen Kumar Gostu, Hyderabad (IN); Athreya Ks, Bangalore (IN); Rajesh Kumar Pirati, Guntur (IN)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 18/229,015

(22) Filed: Aug. 1, 2023

(65) Prior Publication Data

US 2025/0047709 A1    Feb. 6, 2025

(51) Int. Cl.
H04L 9/40 (2022.01)

(52) U.S. Cl.
CPC ............ H04L 63/20 (2013.01); H04L 63/104 (2013.01)

(58) Field of Classification Search
CPC .............................. H04L 63/20; H04L 63/104
See application file for complete search history.

(56) References Cited

U.S. PATENT DOCUMENTS

| 9,699,194 | B2 * | 7/2017 | Hitomi | G06F 21/6218 |
| 10,318,285 | B1 * | 6/2019 | Jodoin | G06F 11/3688 |
| 10,785,128 | B1 * | 9/2020 | Bawcom | G06F 8/38 |
| 10,848,522 | B2 | 11/2020 | Prasad et al. | |
| 11,003,490 | B2 * | 5/2021 | Mitevski | G06F 9/4843 |
| 11,132,226 | B2 * | 9/2021 | Jadhav | G06F 9/5077 |
| 11,150,895 | B1 * | 10/2021 | Wall | G06F 8/65 |
| 11,165,783 | B1 * | 11/2021 | Eiers | G06F 9/4498 |
| 11,516,222 | B1 * | 11/2022 | Srinivasan | G06F 21/577 |
| 11,546,271 | B2 * | 1/2023 | Goyal | G06F 21/31 |

(Continued)

OTHER PUBLICATIONS

Sokolowski, Daniel. "Infrastructure as code for dynamic deployments." Proceedings of the 30th ACM Joint European Software Engineering Conference and Symposium on the Foundations of Software Engineering. 2022. (Year: 2022).*

(Continued)

*Primary Examiner* — Theodore C Parsons
*Assistant Examiner* — Sameera Wickramasuriya
(74) *Attorney, Agent, or Firm* — Aaron N. Pontikos

(57) ABSTRACT

A computer-implemented method, according to one embodiment, includes analyzing a deployment plan for an instance of Infrastructure as Code (IaC) code to identify a plurality of milestones of the deployment plan, and creating access policies for the identified milestones. The method further includes monitoring milestone state logs during an execution of the instance of IaC code for occurrence of predetermined milestone events. In response to a determination that a first of the predetermined milestone events has occurred, first user device access permissions are adjusted based on the created access policies. A computer program product, according to one embodiment, includes a computer readable storage medium having program instructions embodied therewith. The program instructions are readable and/or executable by a processing circuit to cause the processing circuit to perform the foregoing method.

20 Claims, 8 Drawing Sheets

(56)      References Cited

U.S. PATENT DOCUMENTS

| | | | |
|---|---|---|---|
| 11,580,239 B2 * | 2/2023 | Carroll, Jr. .......... | G06F 21/6218 |
| 12,063,166 B1 * | 8/2024 | Samba .................. | H04L 47/781 |
| 12,147,803 B2 * | 11/2024 | Kwatra .................... | G06F 8/60 |
| 2009/0089078 A1 * | 4/2009 | Bursey ................ | G06Q 10/101 |
| | | | 382/293 |
| 2017/0026416 A1 * | 1/2017 | Carpenter .......... | H04L 41/0866 |
| 2019/0294477 A1 * | 9/2019 | Koppes ................ | G06F 9/5072 |
| 2020/0045083 A1 * | 2/2020 | Prasad ................. | H04L 63/107 |
| 2020/0076819 A1 * | 3/2020 | Spurlock ................ | G06F 21/10 |
| 2021/0055927 A1 * | 2/2021 | Sarukkai .................. | G06F 8/71 |
| 2022/0121480 A1 * | 4/2022 | Chivukula ............ | G06F 9/5072 |
| 2022/0353289 A1 * | 11/2022 | Witschey ............ | G06F 9/44505 |
| 2022/0353341 A1 * | 11/2022 | Östrand ................. | H04L 67/51 |
| 2023/0065530 A1 * | 3/2023 | Mohanty ............ | G06F 11/3608 |
| 2023/0077995 A1 * | 3/2023 | McGrath .................. | G06F 9/54 |
| | | | 719/328 |
| 2025/0004856 A1 * | 1/2025 | Genis ................... | G06F 9/5077 |

OTHER PUBLICATIONS

Ermetic, "Secure Your Public Cloud with Just-in-Time Access, " Ermetic, 2023, 8 pages, retrieved from https://ermetic.com/solution/just-in-time/ on May 8, 2023.

IBM, "Setting up access groups," IBM Cloud Docs, Jan. 24, 2023, 5 pages, retrieved from https://cloud.ibm.com/docs/account?topic=account-groups&interface=ui.

Servicenow, "Control AWS access and permissions using policies," Servicenow, 2023, 4 pages, retrieved from https://docs.servicenow.com/en-US/bundle/utah-it-operations-management/page/product/it-operations-management/task/aws-create-user-policy-cloud-mgt.html on May 8, 2023.

Web Sequence Diagrams, "Untitled," 2023, 1 page, retrieved from https://www.websequencediagrams.com/.

Weitzner et al., "Creating a Policy-Aware Web: Discretionary, Rule-based Access for the World Wide Web," preprint to appear in: Web and Information Security, 2004, 24 pages, retrieved from https://www.w3.org/2004/09/Policy-Aware-Web-acl.pdf.

Li et al., "Design and Application of Rule Based Access Control Policies," Semantic Scholar, 2005, 8 pages, retrieved from https://redirect.cs.umbc.edu/csee/research/swpw/papers/zhang.pdf.

Bergmann et al., "Towards Efficient Evaluation of Rule-based Permissions for Fine-grained Access Control in Collaborative Modeling," CEUR Workshop Proceedings, 2019, 10 pages, retrieved from https://ceur-ws.org/Vol-2019/commitmde_2.pdf.

Uddin et al., "A Dynamic Access Control Model Using Authorising Workflow and Task-Role-Based Access Control," IEEE Access, vol. 7, Oct. 14, 2019, pp. 166676-166689.

Bertolissi et al., "Automated Analysis of Rule-Based Access Control Policies," Presentation, Programming Languages meets Program Verification (PLPV), Jan. 22, 2013, 28 pages.

Leitner et al., "AW-RBAC: Access Control in Adaptive Workflow Systems," Sixth International Conference on Availability, Reliability and Security, 2011, 8 pages, retrieved from https://eprints.cs.univie.ac.at/2858/1/ARES_AW-RBAC_LeRi2011.pdf.

Ahn et al., "Injecting RBAC to Secure a Web-based Workflow System," RBAC '00: Proceedings of the fifth ACM workshop on Role-based access control, Jul. 2000, pp. 1-10.

Wainer et al., "W-RBAC—A Workflow Security Model Incorporating Controlled Overriding of Constraints," International Journal of Cooperative Information Systems, vol. 12, No. 4, 2003, pp. 435-485.

Budzik et al., "User Interactions with Everyday Applications as Context for Just-in-time Information Access," International Conference on Intelligent User Interfaces, Jan. 9, 2000, 8 pages, retrieved from https://www.semanticscholar.org/paper/User-interactions-with-everyday-applications-as-for-Budzik-Hammond/83ee7a2b45e17f423e344fb25245d8a952244484.

Oliveira et al., "AC-ABAC: Attribute-based access control for electronic medical records during acute care," Expert Systems With Applications, vol. 213, 2023, pp. 1-12.

* cited by examiner

100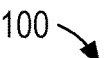

CLIENT COMPUTER 101

PROCESSOR SET 110

PROCESSING CIRCUITRY 120     CACHE 121

COMMUNICATION FABRIC 111

VOLATILE MEMORY 112

PERSISTENT STORAGE 113

OPERATING SYSTEM 122

ACCESS PERMISSION ADJUSTMENT CODE

150

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

FIG. 1

| Time (minutes) | 0 | 4 | 8 | 12 | 16 | 20 | 24 | 28 | 32 | 36 |
|---|---|---|---|---|---|---|---|---|---|---|
| Resource | R1 | R4 | R4 | R4 | | | | | | |
| | R2 | R2 | R3 | R3 | R3 | R3 | R3 | R5 | R5 | X |

| Resource | R1 | R2 | R3 | R4 | R5 |
|---|---|---|---|---|---|
| Permission | R1 | R4 | R4 | R4 | |

340

| Milestone 1 | R1 | R2 |
|---|---|---|
| Milestone 2 | R3 | R4 |
| Milestone 3 | R5 | |

360

| Milestone 1 access policy | R1 (Create) | R2 (Update) |
|---|---|---|
| Milestone 2 access policy | R3 (Create) | R4 (Create) |
| Milestone 3 access policy | R5 (Update) | |

| Resource | R1 | R2 | R3 | R4 | R5 |
|---|---|---|---|---|---|
| Action | No change | Update | Update | No change | Destroy |
| Permission | ----- | Update | Update | ----- | Destroy |

| Milestone 1 | R2 |
|-------------|----|
| Milestone 2 | R3 |
| Milestone 3 | R5 |

440

| Milestone 1 access policy | R2 (Update) |
|---------------------------|-------------|
| Milestone 2 access policy | R3 (Update) |
| Milestone 3 access policy | R5 (Destroy) |

ADJUSTMENT OF ACCESS PERMISSIONS OF USER DEVICES BASED ON CREATED ACCESS POLICIES

BACKGROUND

The present invention relates to Infrastructure as Code (IaC), and more specifically, this invention relates to adjusting access permissions of user devices based on created access policies.

IaC automation templates are used to declaratively provision cloud resources. An IaC automation template acts as a single source of truth for cloud configuration data. In addition, the IaC code or IaC template acts as a dynamic workflow definition, that may be used by an underlying workflow engine to program and configure the cloud in a systematic manner. IaC code may be changed at any time, and the new IaC Code may be deployed to a cloud infrastructure. Tools may be configured to assess and/or detect the changes in configuration state, build a workflow (to achieve a goal state), and incrementally update a configuration state of a cloud environment.

A user device, e.g., the subject, that is performing a configuration change, using the IaC code, must have permissions associated with the updates to the cloud's configuration state. For context, each cloud resource in the IaC code may have a unique associated permission or access-control definition that the user device must request and obtain in order to perform cloud operations. In conventional deployments, it may be assumed that the user device has already obtained the necessary permissions from an administrator device, to perform the cloud operations (to update the configuration state) on all the relevant cloud resources. One of these conventional approaches for obtaining these permissions includes inspecting the IaC code to determine a list of resources that must be touched for the update, and sharing the list of resources (and operations) with the administrator device in order to obtain the associated permissions.

SUMMARY

A computer-implemented method, according to one embodiment, includes analyzing a deployment plan for an instance of Infrastructure as Code (IaC) code to identify a plurality of milestones of the deployment plan, and creating access policies for the identified milestones. The method further includes monitoring milestone state logs during an execution of the instance of IaC code for occurrence of predetermined milestone events. In response to a determination that a first of the predetermined milestone events has occurred, first user device access permissions are adjusted based on the created access policies.

A computer program product, according to one embodiment, includes a computer readable storage medium having program instructions embodied therewith. The program instructions are readable and/or executable by a processing circuit to cause the processing circuit to perform the foregoing method.

A system, according to one embodiment, includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

FIGS. 4A-4C are tables, in accordance with several embodiments of the present invention.

DETAILED DESCRIPTION

Figure 2:
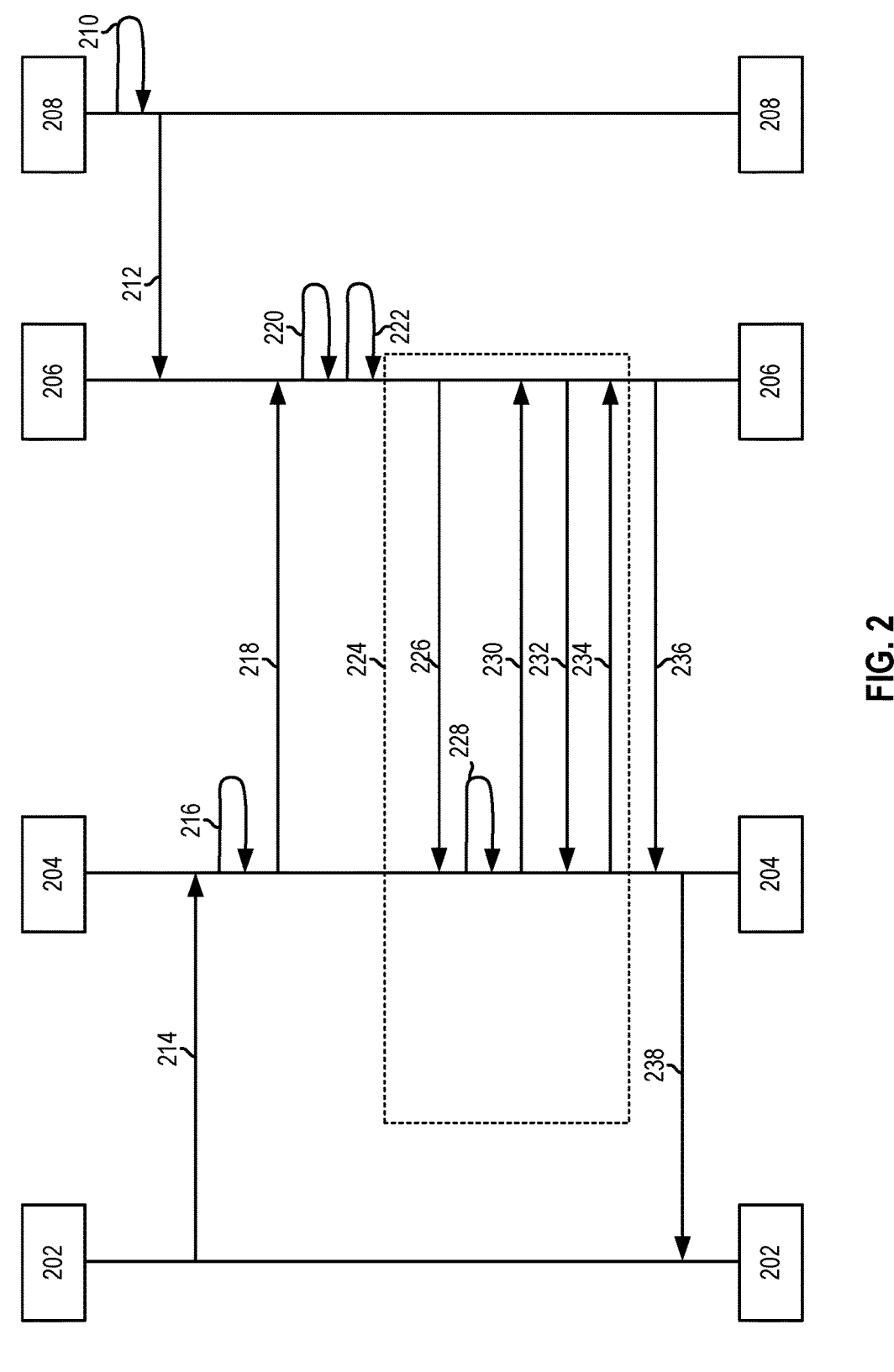
FIG. 2 is a flowchart of a method, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for adjusting access permissions of user devices based on created access policies.

In one general embodiment, a computer-implemented method includes analyzing a deployment plan for an instance of Infrastructure as Code (IaC) code to identify a plurality of milestones of the deployment plan, and creating access policies for the identified milestones. The method further includes monitoring milestone state logs during an execution of the instance of IaC code for occurrence of predetermined milestone events. In response to a determination that a first of the predetermined milestone events has occurred, first user device access permissions are adjusted based on the created access policies.

In another general embodiment, a computer program product includes a computer readable storage medium having program instructions embodied therewith. The program instructions are readable and/or executable by a processing circuit to cause the processing circuit to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as access permission adjustment code of block 150 for adjusting access permissions of user devices based on created access policies. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere herein, IaC automation templates are used to declaratively provision cloud resources. An IaC automation template acts as a single source of truth for cloud configuration data. In addition, the IaC code or IaC template acts as a dynamic workflow definition, that may be used by an underlying workflow engine to program and configure the cloud in a systematic manner. IaC code may be changed at any time, and the new IaC Code may be deployed to a cloud infrastructure. The configuration of the cloud resources may also be changed at any time, using the graphical user interface (GUI) or command line interface (CLI). Tools may be configured to assess and/or detect the changes in configuration state, dynamically build a workflow (to achieve a goal state), and incrementally update a configuration state of a cloud environment.

A user device, e.g., the subject, that is performing a configuration change, using the IaC code, must have permissions associated with the updates to the cloud's configuration state. For context, each cloud resource in the IaC code may have a unique associated permission or access-control definition that the user device must request and obtain in order to perform cloud operations. In conventional deployments, it may be assumed that the user device has already obtained the necessary permissions from an administrator device, to perform the cloud operations (to update the configuration state) on all the relevant cloud resources. One of these conventional approaches for obtaining these permissions includes inspecting the IaC code to determine a list of resources that must be touched for the update, and sharing the list of resources (and operations) with the administrator device in order to obtain the associated permissions.

The conventional techniques for obtaining permissions described above involve IaC code that is used to assemble multiple cloud-resources. Within some of these techniques and IaC code use cases, each cloud-resource has a predefined set of permissions (or access controls) to perform create, read, update, and delete (CRUD) operations on its configuration state. However, these techniques become problematic when a user device performs CRUD operation on the composite IaC Code in that there is no guarantee that the user device will obtain and have the permissions to all the cloud-resources used in the IaC Code. This leads to some instances of user devices not gaining permission to access at least some resources associated with updates to a cloud's configuration state. These instances ultimately compromise performance of a cloud environment that includes the cloud-resources, because, e.g., the user devices are unable to access the available cloud resources, troubleshooting must be performed to manually obtain permissions for the user devices, the cloud resources are sometimes no longer available by the time that the user devices finally obtain permissions to the cloud resources, etc. For at least these reasons, there is a longstanding need for techniques that define an access-policy for composite resources described using an "IaC code" that dynamically morphs based on both a current state of the cloud environment, and a desired state expressed in an IaC code. In sharp contrast to the deficiencies described above, techniques described herein dynamically modify the permission levels for user devices to access cloud resources (in IaC code) during execution of the IaC code such that, a user device is provided with the permissions associated with operating on the cloud-resources, in a just-in-time manner.

Now referring to FIG. 2, a flowchart of a method 200 is shown according to one embodiment. The method 200 may be performed in accordance with the present invention in any of the environments depicted in FIGS. 1-5, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a processing circuit, e.g., such as an IaC access manager, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 200 may be performed in a type of cloud environment that would become apparent to one of ordinary skill in the art after reading the descriptions herein. In some preferred approaches, the cloud environment includes at least one user device (see first user device 202), an IaC deployment manager component 204, an IaC access manager component 206, and an administrator device 208. In some preferred approaches, the IaC deployment manager component is an infrastructure tool responsible for IaC deployment, and the IaC access manager component is a component that is configured to identity and access management (IAM) or IAM enabled services. Various approaches described below detail interactions between these components. It may also be noted that operations of method 200 may be performed in a cloud environment that includes a plurality of cloud resources. For example, depending on the approach, these cloud resources may include, e.g., object storage, access to a predetermined database, use of a virtual private cloud (VPC), use of a data engine, access to cloud computing processing and/or computing resources, etc. Furthermore, in some approaches, the operations of method 200 may be performed with respect to IaC code. In one of such approaches, the IaC code may be TERRAFORM.

In some approaches, method 200 includes a just-in-time access policy for a group of user devices and/or users associated with the user device being defined, e.g., see operation 210. In some approaches, the just-in-time access policy is defined by the administrator device 208. For context, the user devices of the just-in-time access policy are user device that are authorized and/or registered to acquire relatively higher privileges and/or permissions (on-demand) to work with a predetermined IaC Code (and resources associated therewith) in an on-demand manner. In some approaches, these user devices may be authorized and/or registered to acquire the relatively higher privileges and/or permissions by a predetermined process, e.g., a registration process in which user devices requesting access to the resources are at least initially subjected to training and/or verification techniques of a type that would become apparent to one of ordinary skill in the art after reading the descriptions herein. For example, operation 212 includes registering at least a first user device, e.g., User-1, with the IaC access manager. As a result of at least the first user device being registered with the IaC access manager, the IaC access manager is preferably configured to cause, e.g., instruct the IaC deployment manager component, the user device to be added to and/or removed from milestone access groups, as will be described in greater detail elsewhere below.

A deployment plan for IaC code may be generated, e.g., by the IaC deployment manager component, based on a current configuration state of the cloud environment, e.g., see operation 216. In some approaches, the deployment plan for IaC code may be generated in response to receiving, e.g., by the IaC deployment manager component from the first user device, a request to initiate an IaC template deployment, e.g., see operation 214. The deployment plan may include information of a type that would become apparent to one of ordinary skill in the art after reading the descriptions herein. For example, in some approaches, such as for a typical first-time deployment, the generated deployment may include a plurality of provisions of resources with respect to one another. For example, the generated deployment may provision, e.g., and/or include an indication, a first predetermined first resource with a predetermined second resource in parallel. The generated deployment may additionally and/or alternatively provision a fourth predetermined resource after the first predetermined resources completes a predetermined operation, provision a third predetermined resource after the second predetermined resource completes a predetermined operation, provision a fifth predetermined resource after the third and fourth predetermined resources complete predetermined task(s), etc.

When shared, the deployment plan for an instance of IaC code that is based on a current configuration state of the cloud environment may be received by the IaC access manager component from the IaC deployment manager component, e.g., see operation 218.

The IaC deployment manager component may use the IaC deployment plan to deploy the IaC code. A typical IaC deployment plan may, in some approaches, include a plurality of milestones. For context, a "milestone" may be anything that refers to or defines a particular stage of deployment, and, in some approaches, defines different periods of time that one or more resources of the cloud environment will be provisioned. The milestones may differ depending on how the cloud resources are tied to one another in the IaC code and/or depending on how a cloud service treats these cloud resources. For example, a first milestone may provision a plurality of predetermined resources. However, in some other approaches, only a single resources may be provisioned for a second milestone. In some approaches, an initial deployment plan may provision a plurality of resources to at least one milestone. In some other approaches, only a subset of the resources provisioned in the initial deployment plan may be provisioned to at least one of the milestones, e.g., based on an updating.

For context, once received, the deployment plan may be analyzed by the IaC access manager component. For example, operation 220 includes analyzing the deployment plan for an instance of IaC code to identify a plurality of milestones of the deployment plan. In some preferred approaches, this analysis identifies and/or inspects the milestones in order to create access policies for the milestones that will occur during execution of the IaC code. In some approaches, an access group may be created for each milestone group, e.g., see operation 222. For context, an "access group" is a group of identities that can be used as the subject of an access policy. For further context, each "access policy" specifies an allowed set of actions. Access policies, in some preferred approaches, have the form of <subject> <role> <resource(s)>, where the "subject" is the user device that may be added to or removed from the access group, the "role" describes the permission used to perform an operation (CRUD) on the cloud resources, and the "resource(s)" are the resources that the subject at least temporarily has access to as a result of being added to the access policy. This way, a plurality of access requests are not otherwise performed by a registered user device, e.g., User-1, in order to access resources of the cloud environment during the different milestones. Instead, the created access policies may be used to provide the user device with just-in-time access to such resources during a predetermined milestone event, with subsequent detachment of the user devices in response to a determination that the predetermined milestone event has concluded. Note that, in some approaches, such detachment is preferably performed regardless of success or failure at the completion of the predetermined milestone event. Access policies are preferably created by the IaC deployment manager component for the milestones identified during the performed analysis. More specifically, in some preferred approaches, method 200 includes analyzing the IaC deployment plan to dynamically create multiple IaC access policies, e.g., one for each milestone in the IaC deployment plan.

In some approaches, method 200 includes determining types of permissions to deploy in the access policies. The types of permissions may, in one or more of such approaches, be determined by searching for and potentially extracting one or more predetermined text elements from the received deployment plan. For example, the deployment plan may indicate one or more operations, e.g., delete, modify, access, etc., that are to be performed in each milestone. Predetermined text elements that are associated with these operations may be identified, e.g., using natural language processing (NLP) techniques that would become apparent to one of ordinary skill in the art after reading the descriptions herein. In some approaches, creating the access policies includes assigning the permissions to resources that are accessible within milestone access groups associated with the access policies. For example, a first permission to delete data may be assigned to a first resource that is to be performed in a first of the milestones of the deployment plan, a second permission to modify data may be assigned to a second resource that is to be performed in the first milestone of the deployment plan, and a third permission to access data may be assigned to a third resource that is to be performed in a second of the milestones of the deployment plan that occurs after the first milestone concludes.

Method 200 may additionally and/or alternatively include estimating amounts of time that using resources in identified milestones will take during the execution of the instance of the IaC code. In some approaches, such estimations may be based on a temporal analysis of previously executed instances of IaC code, e.g., where the previously executed instances of IaC code are determined to have at least a predetermined degree of similarity with the instance of IaC code associated with the received deployment plan. Accordingly, in some approaches, the access policies may be created based on the estimated amounts of time.

Box 224 of method 200 includes operations of a predetermined milestone deployment process. For context, the predetermined milestone deployment process includes ensuring that user devices do not have to initiate resource permissions during an execution of the instance of IaC code. In some approaches, the predetermined milestone deployment process may include execution of the instance of IaC code being initiated. Upon the instance of the IaC code being initiated, the predetermined milestone deployment process may include adding a user device, e.g., the first user device, to one of the new milestone access groups. In some preferred approaches, during the predetermined milestone deployment process, user devices are added to at least an initial one of the milestone access groups in response to a determination that one of the milestone events has begun during the execution of the instance of IaC code. For example, in some approaches, a first of the predetermined milestone events may include a first milestone event being initiated. In one or more of such approaches, the adjustment performed in response to the determination that the first of the predetermined milestone events has occurred may include causing a first user device to be added to a first milestone access group that is associated with a first of the access policies, e.g., see operation 226. The first user device may, in some approaches, be caused to be added to a first milestone access group by the IaC access manager issuing an assignment instruction to the IaC deployment manager. For context, "adding" a given user device to a milestone access group may provide the user device with access to one or more predetermined cloud resources according to an access policy, e.g., see milestone resource deployment in operation 228. For example, the first user device preferably has access to at least a first cloud resource as a result of being added to the first milestone access group, and the first user device does not have access to the first cloud resource when not otherwise added/included in the first milestone access group. In other words, access to resources is selectively granted to a determined user device for at least a temporary period of time as a result of a milestone event occurring during execution of the instance of the IaC code. This selective granting enables a dynamically morphing access-policy based on the current state of the cloud environment and the desired state expressed in the IaC code. Furthermore, the techniques described herein enable dynamic modification of the permission levels for user device(s) to access cloud resources in IaC code while performing a long-running IaC automation for a collection of cloud-resources. This ensures security and oversight in the cloud environment by ensuring that the user device is allowed only a minimal or a relatively least extent of permissions that are required to operate on the cloud-resources just-in-time.

The cloud resources that user devices have access to as a result of being added to a milestone access group may depend on the approach and/or deployment parameters. However, it should be noted that this access to the cloud resources is preferably only provided to the user device upon being added to the milestone access group. Accordingly, in some approaches, upon the IaC deployment manager component beginning to run the instance of the IaC code, the IaC Access Manager component preferably uses a just-in-time access policy to activate an associated access policy for the user device, e.g., by an instruction being issued for attaching the user device to the milestone access group. In some illustrative approaches, a first of the cloud resources includes object storage. In another approach, the cloud resources may additionally and/or alternatively include access to a predetermined database. In yet another approach, the cloud resources may additionally and/or alternatively include use of a virtual private cloud (VPC). In yet another approach, the cloud resources may additionally and/or alternatively include use of a data engine. It should be noted that the created access policies preferably define what resources are available to user devices that are added to an associated milestone access group. For example, a first of the created access policies may specify that a first resource is made available to a first user device during a first milestone that occurs during execution of the instance of the IaC code.

Subsequent to being added to a milestone access group, the first user device is preferably not indefinitely provided access to the cloud resources within the first milestone access group. Instead, metrics may be monitored for determining when to remove the first user device from the milestone access group. In some preferred approaches, milestone state logs are examined and monitored to determine and monitor such metrics. This monitoring may include reviewing logs and/or event information received from the IaC deployment manager component to understand a state of the running instance of IaC code execution. In some approaches, this monitoring may additionally and/or alternatively include monitoring cloud-resources deployed by the instance of IaC code to determine whether any configuration change events have occurred. For context, in some approaches, the milestone state logs preferably detail the progression of the milestones during execution of the instance of the IaC code, and therefore may be accessed to determine whether a given identified milestone has concluded and/or another identified milestone has begun. Accordingly, milestone state logs may be received and/or requested, and the milestone state logs may be monitored during an execution of the instance of IaC code for occurrence of predetermined milestone events, e.g., see operation 230. The monitoring may, in some approaches, include determining whether performance metrics pre-associated with a first of the milestone events has ended and/or whether performance metrics pre-associated with a second of the milestone events have been detected. For example, in a first of such approaches, in response to a determination that predetermined performance metrics, e.g., use of cloud resources associated with the first milestone event, processing operations that began upon the first user device being added to the first milestone access group, processing operations decreasing a predetermined amount, etc., pre-associated with a first of the milestone events are no longer present in the milestone state logs, a determination may be made that a predetermined milestone event has occurred. In such an approach, the predetermined milestone event includes the first milestone event ending.

In response to a determination that a first of the predetermined milestone events has occurred, method 200 includes adjusting user device access permissions based on the created access policies. More specifically, in some approaches, the IaC access manager component may be caused to auto-adjust the access permissions of the user device depending on a milestone state of the IaC deployment plan execution. This may be achieved by moving the user device and/or a subject to a next milestone-specific access group, thereby switching to a new access policy. For example, in some preferred approaches, the access permissions of a user device that are currently included in a milestone access group are adjusted to detach the user device from the milestone access group, e.g., user devices are detached from milestone access groups in response to a determination that the milestone has completed. In one of such approaches, this adjustment includes adjusting access permissions of the first user device based on a first of the created access policies that specifies that the first user device is to be removed from the first milestone access group in response to a determination that the first milestone has completed, e.g., see operation 232.

Method 200 may additionally and/or alternatively include initiating further milestone deployments in response to a determination that the first milestone event has occurred, e.g., see operation 234. In some approaches, these further milestone deployments may include continuing to monitor for predetermined milestone events, e.g., such as the beginning of and/or the ending of milestone events, and in response to a determination that one or more of such milestone events have occurred, adjusting user device access permissions based on the created access policies. For example, in response to a determination that a second of the predetermined milestone events has occurred, method 200 includes adjusting the first user device access permissions and second user device access permissions based on the created access policies. In some approaches, the adjustments performed in response to the determination that the second of the predetermined milestone events has occurred includes causing a second user device to be added to a second milestone access group associated with a second of the access policies. The second user device may have access to at least a second cloud resource as a result of being added to the second milestone access group, and the second user device may not have access to the second cloud resource when not otherwise added/included in the second milestone access group. Furthermore, in some approaches, the first user device is caused to be removed from the first milestone access group and the first user device loses access to at least the first cloud resource as a result of being removed from the first milestone access group. This loss of access to at least the first cloud resource may, in some approaches, occur at the same time that the second user device gains access to at least the second cloud resource.

It should be noted that although various approaches above describe a first user device and a second user device having user device access permissions adjusted throughout the different milestone events, in some approaches, a single user device, e.g., the first user device, may have user device access permissions across two or more of the milestone events, e.g., the first user device may be moved from a first milestone access group to a second milestone access group in response to a determination that the first milestone has been successfully completed.

The adjustment of user device access permissions in response to determination(s) that predetermined milestone events have occurred may continue until all of the milestones are completed during the execution of the instance of IaC code. Accordingly, method 200 may, in some approaches, include adding and detaching, e.g., a third user device, a fourth user devices, a fifth user device, etc., from milestone access groups until a determination is made that a user device is detached from a last of the milestone access groups, e.g., see operation 236. It should be noted that, during such additions and/or detachments, one or more of the cloud resources may be dependent on at least one other cloud resource. For example, in some approaches, the second cloud resource is dependent on the first cloud resource. This dependency may mean that the second resource cannot be used until use of the first resource is complete. Accordingly, in some approaches, the provisioning of the second resource may be delayed until a determination is made that processing using the first resource has completed, e.g., processing performed by the first user device using the first resource.

Operation 238 includes finishing the IaC template deployment. In some approaches, finishing the IaC template deployment includes relaying the IaC template to the user device. The IaC template preferably includes the created access policies and/or other instructions generated during the initial execution of the instance of IaC code, e.g., additions and/or detachments performed during the predetermined milestone deployment process.

Although various approaches above detail a use case in which an IaC template for provisioning cloud resources is created, in some other approaches, method 200 may additionally and/or alternatively include the IaC template being updated. For example, in some approaches, the execution of the instance of IaC code may cause updates of a subset of cloud resources that are associated with the access policies. In one or more of such approaches, the predetermined milestone events may only be based on the created access policies associated with the subset of the cloud resources. In other words, in some approaches, only detection of milestone events associated with the cloud resources that are being updated result in adjustments to user device access permissions, while no changes are performed to the other resource provisioning specified in the IaC template, e.g., the resource provisioning of the IaC template that the updates do not affect.

Various performance benefits are enabled as a result of deploying the techniques described herein in a cloud environment in which cloud resources are provisioned to user devices. These techniques may be used to define and enforce a just-in-time authorization policy for composite resources described using an IaC code. For example, the techniques described herein provide permission guarantees for accessing cloud resources that are not otherwise available using conventional techniques for performing CRUD operations. Accordingly, instances of user devices not gaining permission to access at least some resources associated with updates to a cloud's configuration state are avoided, thereby increasing performance of a cloud environment that includes the cloud-resources. Furthermore, performance of the cloud environment is also improved as a result of avoiding such permission failure events, because troubleshooting operations to manually obtain permissions for the user devices are also mitigated.

FIGS. 3A-3D depicts tables 300, 320, 340 and 360 that include information used for adjusting access permissions of user devices based on created access policies, in accordance with several embodiments. As an option, the present tables 300, 320, 340 and 360 may be implemented in conjunction with features from any other embodiment listed herein, such as those described with reference to the other FIGS. Of course, however, such tables 300, 320, 340 and 360 and others presented herein may be used in various applications and/or in permutations which may or may not be specifically described in the illustrative embodiments listed herein. Further, the tables 300, 320, 340 and 360 presented herein may be used in any desired environment.

It may be prefaced that the tables 300, 320, 340 and 360 include information that is based on an IaC template (as an instance of IaC code) that is used to provision the cloud resources: R1, R2, R3, R4 and R5. It may be assumed that resource dependencies exist that include: R3 being dependent on R2, R5 being dependent on R3 and R4, and R4 being dependent on R1. Respective amounts of time that using the cloud resources in a plurality of milestones identified within a deployment plan for the instance of IaC code will take during the execution of the instance of the IaC code may be estimated. In some approaches, the time estimates for the cloud resources include: R1: 3 minutes, R2: 8 minutes, R3: 20 minutes, R4: 10 minutes and R5: 7 minutes.

Figures 3A, 3B:
FIGS. 3A-3D are tables, in accordance with several embodiments of the present invention.

In some approaches, in a typical first-time deployment, an open-source IaC software tool, e.g., such as TERRAFORM, may be used to generate a deployment plan. In some approaches, the deployment plan may provision R1 and R2 in parallel, provision R4 after R1 completes, provision R3 after R2 completes, and provision R5 after R3 and R4 complete. Referring now to FIG. 3A, the deployment plan is shown arranged in the table 300. The table 300 details the deployment plan as a temporal breakdown of usage of the cloud resources. It may be noted that this temporal breakdown considers the resource dependencies, e.g., R1 and R2 are used in parallel, R3 is not used until usage of R2 is complete, R5 is not used until usage of R3 and R4 is complete, etc. In some approaches, a user device that is used to deploy this IaC template for the first time may need the permissions detailed in the table 320 of FIG. 3B. For example, a first user device may need a create type access permission to use R1, an update type access permission to use R2, a create type access permission to use R3, a create type access permission to use R4, and an update type access permission to use R5.

Figure 3C:
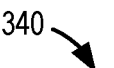
Figure 3D:
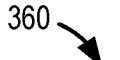

Based on the above information, an IaC IAM access manager component may be caused to generate cloud resource provisioning milestones in table 340 of FIG. 3C. For example, a first milestone, e.g., see Milestone 1, may include R1 and R2, a second milestone, e.g., see Milestone 2, may include R3 and R4, and a third milestone, e.g., see Milestone 3, may include R5. With reference now to FIG. 3D, access policies may be created for the identified milestones. For example, the table 360 includes a first milestone access policy, e.g., see Milestone 1 access policy, that includes R1 (create) and R2 (update). Furthermore, the table 360 includes a second milestone, e.g., see Milestone 2 access policy, that includes R3 (create) and R4 (create). Finally, the table 360 further includes a third milestone access policy, e.g., see Milestone 3 access policy, that includes R5 (update). It may be noted that, in some approaches, a granularity of the number of resources managed per milestone may be configurable. In addition, the resource groups of the cloud resources are preferably considered while drawing boundaries for the milestones.

In some illustrative use cases, a predetermined process may be performed that includes using the information of the tables 300, 320, 340 and 360 to adjust access permissions of user devices based on created access policies. In one or more of such use cases, a cloud account administrator device may be used to create a just-in-time access policy for user devices that will be given permissions (on-demand) to provision or configure the cloud resources using the selected IaC code. These user devices are prevented from using this permission outside the scope of the IaC code execution based on being added and detached from milestone access groups.

Upon initiation of the deployment of the IaC template, the predetermined process may include causing an IaC IAM access manager component to create multiple milestone access policies (for all identified IaC milestones, and corresponding milestone access groups). In response to a determination that a user device belongs to the just-in-time access policy of the IaC template, the user device is added to the milestone 1 access group. An IaC code engine, e.g., an IaC deployment manager component, may be caused, e.g., instructed by the IaC IAM access manager component to provision cloud resources R1 and R2 (milestone 1). Furthermore, the IaC IAM access manager component may be caused to monitor progress of provisioning of the resources R1 and R2 and the IaC automation logs and/or events. In response to a determination that milestone 1 has successfully completed, the user device is moved from milestone 1 access group to milestone 2 access group.

In some approaches, the IaC deployment manager component is made aware of the changes being made by the IaC IAM access manager component, e.g., by outputs of the IaC IAM access manager component to the IaC deployment manager component, and may be caused to wait before starting the next milestone tasks. The IaC code engine, e.g., an IaC deployment manager component, may be caused to provision resources R3 and R4 (milestone 2) based on an instruction issued by the IaC IAM access manager component. The IaC IAM access manager component then monitors the progress of provisioning the resource R3 & R4. In response to a determination that the second milestone has been successfully completed, the first user device is caused to be moved from milestone 2 access group to milestone 3 access group.

The predetermined process may additionally and/or alternatively include the IaC code engine, e.g., an IaC deployment manager component, provisioning cloud resource R5. In response to a determination that the third milestone event, e.g., milestone 3, has been successfully completed, the user device is removed from the milestone 3 access group.

During this deployment (execution of the instance of IaC code), the user device is provided with the permissions to provision the cloud resources in the IaC template, and therefore the user device does not have to otherwise request each of such permissions. Subsequently, these permissions are withdrawn. In some approaches, the user device is granted permissions only during the provisioning action, thereby ensuring that the user device is scoped to relevant resource instances and/or resource groups.

Figure 4B:
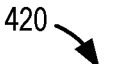
Figure 4C:
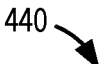

FIGS. 4A-4C depicts tables 400, 420 and 440 that include information used for updating access permissions of user devices in a cloud environment that is already provisioned, in accordance with several embodiments. As an option, the present tables 400, 420 and 440 may be implemented in conjunction with features from any other embodiment listed herein, such as those described with reference to the other FIGS. Of course, however, such tables 400, 420 and 440 and others presented herein may be used in various applications and/or in permutations which may or may not be specifically described in the illustrative embodiments listed herein. Further, the tables 400, 420 and 440 presented herein may be used in any desired environment.

It may be prefaced that FIGS. 4A-4C detail an extension to the scenario described above, e.g., see FIGS. 3A-3D. More specifically, FIGS. 4A-4C detail information associated with a cloud environment that is already provisioned using an IaC template to configure cloud resources R1, R2, R3, R4, and R5. In the current approach, it may be assumed that a user device initiates a change of the configuration of a few cloud resources in the IaC template. Referring now to FIG. 4A, the table 400 includes information that may be used to determine the list of resources that will be modified as a result of the configuration change. For example, the deployment plan to deploy the configuration change includes: a first update to the cloud resource R2, a second update to the cloud resource R3 (after R2 completes), and destroying the cloud resource R5 (after R3 completes).

Based on the information in the table 300, an IaC IAM access manager component may generate resource provisioning milestones. With reference now to table 420 of FIG. 4B, these resource provisioning milestones may include: milestone 1: R2, milestone 2: R3, and milestone 3: R5. Furthermore, an access policy may be generated for each of the milestones. As illustrated in table 440 of FIG. 4C, these policies may include a first milestone access policy, e.g., see Milestone 1 access policy, a second milestone access policy, e.g., see Milestone 2 access policy, and a third milestone access policy, e.g., see Milestone 3 access policy. It should be noted that, in some approaches, a granularity of the number of resources managed per milestone is configurable.

Upon initiation of configuration change based on the deployment plan, a predetermined update process may be performed that includes creating milestone access policies and milestone access groups for the three milestones. In response to a determination that a user device belongs to the just-in-time access policy of the IaC template, the user device is added to the milestone 1 access group. The IaC code engine, e.g., an IaC deployment manager component, may be caused to update the cloud resource R2.

The IaC IAM access manager component may monitor the progress of provisioning the cloud resource R2 and the IaC automation logs and/or events. In response to a determination that the milestone 1 has successfully completed, the user device is moved from the milestone 1 access group to the milestone 2 access group. In some approaches, the IaC code engine, e.g., the IaC deployment manager component, may be caused, e.g., based on an instruction from the IaC IAM access manager component to update the cloud resource R3.

The predetermined process may additionally and/or alternatively include the IaC IAM access manager component monitoring the progress of updates to the cloud resource R3. In response to a determination that the milestone 2 has successfully completed, the user device is caused to move from the milestone 2 access group to the milestone 3 access group. In some approaches, the IaC deployment manager component may be caused, e.g., instructed, to destroy cloud resource R5 in accordance with the update. Thereafter, in response to a determination that milestone 3 has been successfully completed, the user device is removed from the milestone 3 access group.

While various approaches above describe techniques in the context of cloud-resource provisioning using an IaC template, these techniques may, in some approaches, additionally and/or alternatively be applied in one or more other use cases. For example, in a further use case, these techniques may be applied to enable contextual access control in a workflow engine. In such a use case, the user devices may be dynamically granted and revoked permissions to perform the automated tasks and/or operations in the workflow definition. In another use case, these techniques may be applied to enable just-in-time milestone-based access control in which a user device's access permission is based on reaching a milestone (or the path taken towards the milestone), which thereby applies the use case to numerous application areas.

Figure 5:
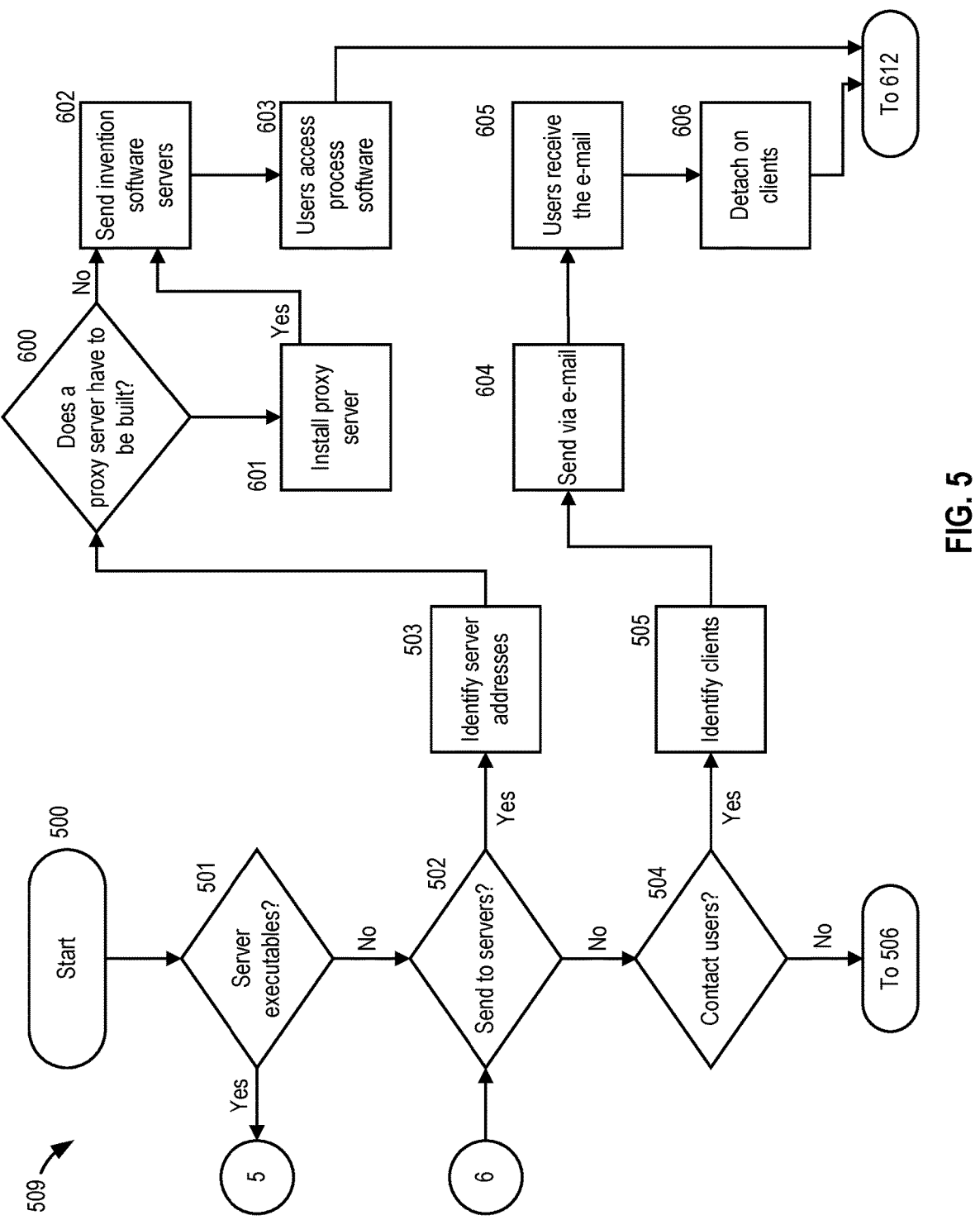
FIG. 5 is a flowchart of a method, in accordance with one embodiment of the present invention.
Figure 5:
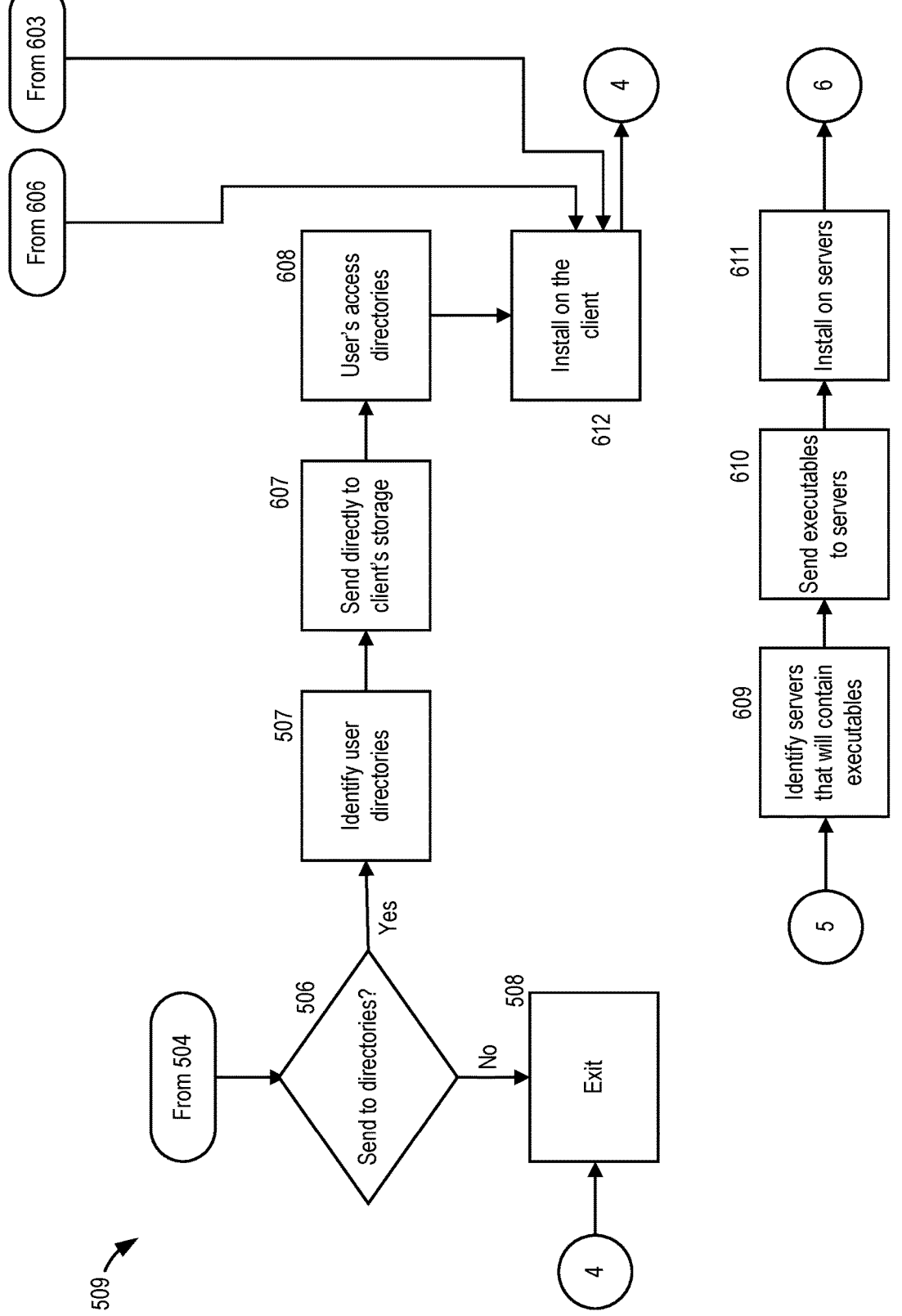

Now referring to FIG. 5, a flowchart of a method 509 is shown according to one embodiment. The method 509 may be performed in accordance with the present invention in any of the environments depicted in FIGS. 1-5, among others, in various embodiments. Of course, more or fewer operations than those specifically described in FIG. 5 may be included in method 509, as would be understood by one of skill in the art upon reading the present descriptions.

Each of the steps of the method 509 may be performed by any suitable component of the operating environment. For example, in various embodiments, the method 509 may be partially or entirely performed by a processing circuit, e.g., such as an IaC access manager, or some other device having one or more processors therein. The processor, e.g., processing circuit(s), chip(s), and/or module(s) implemented in hardware and/or software, and preferably having at least one hardware component, may be utilized in any device to perform one or more steps of the method 509. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software associated with adjusting access permissions of user devices based on created access policies may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

With continued reference to method 509, step 500 begins the deployment of the process software. An initial step is to determine if there are any programs that will reside on a server or servers when the process software is executed (501). If this is the case, then the servers that will contain the executables are identified (609). The process software for the server or servers is transferred directly to the servers' storage via FTP or some other protocol or by copying though the use of a shared file system (610). The process software is then installed on the servers (611).

Next, a determination is made on whether the process software is to be deployed by having users access the process software on a server or servers (502). If the users are to access the process software on servers, then the server addresses that will store the process software are identified (503).

A determination is made if a proxy server is to be built (600) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (601). The process software is sent to the (one or more) servers either via a protocol such as FTP, or it is copied directly from the source files to the server files via file sharing (602). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (603). Another embodiment is to have the servers automatically copy the process software to each client and then run the installation program for the process software at each client computer. The user executes the program that installs the process software on his client computer (612) and then exits the process (508).

In step 504 a determination is made whether the process software is to be deployed by sending the process software to users via e-mail. The set of users where the process software will be deployed are identified together with the addresses of the user client computers (505). The process software is sent via e-mail (604) to each of the users' client computers. The users then receive the e-mail (605) and then detach the process software from the e-mail to a directory on their client computers (606). The user executes the program that installs the process software on his client computer (612) and then exits the process (508).

Lastly, a determination is made on whether the process software will be sent directly to user directories on their client computers (506). If so, the user directories are identified (507). The process software is transferred directly to the user's client computer directory (607). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (608). The user executes the program that installs the process software on his client computer (612) and then exits the process (508).

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   analyzing a deployment plan for an instance of Infrastructure as Code (IaC) code to identify a plurality of milestones of the deployment plan,
   wherein the identified milestones define different periods of time that one or more cloud resources of a cloud environment will be provisioned;
   estimating amounts of time that using the one or more cloud resources will take, with respect to the identified milestones, during an execution of the instance of the IaC code;
   creating, based on the estimated amounts of time, access policies for the identified milestones;
   monitoring milestone state logs during the execution of the instance of IaC code for occurrence of predetermined milestone events; and
   in response to a determination that a first of the predetermined milestone events has occurred, adjusting first user device access permissions based on the created access policies.

2. The computer-implemented method of claim 1, wherein the first predetermined milestone event includes a first milestone event being initiated, wherein the adjustment performed in response to the determination that the first predetermined milestone event has occurred includes: causing a first user device to be added to a first milestone access group associated with a first of the access policies.

3. The computer-implemented method of claim 2, wherein the first user device has access to at least a first of the cloud resources as a result of being added to the first milestone access group.

4. The computer-implemented method of claim 3, comprising: in response to a determination that a second of the predetermined milestone events has occurred, adjusting the first user device access permissions and second user device access permissions based on the created access policies, wherein the adjustments performed in response to the determination that the second of the predetermined milestone events has occurred includes: causing a second user device to be added to a second milestone access group associated with a second of the access policies and causing the first user device to be removed from the first milestone access group.

5. The computer-implemented method of claim 4, wherein the second user device has access to at least a second of the cloud resources as a result of being added to the second milestone access group, wherein the first user device loses access to at least the first cloud resource as a result of being removed from the first milestone access group.

6. The computer-implemented method of claim 5, wherein the second cloud resource is dependent on the first cloud resource, wherein the dependency of the second cloud resource on the first cloud resource prevents the second cloud resource from being used until use of the first cloud resource is complete.

7. The computer-implemented method of claim 6, wherein the cloud resources are selected from the group consisting of: object storage, access to a predetermined database, use of a virtual private cloud (VPC), and use of a data engine.

8. The computer-implemented method of claim 1, comprising: determining types of permissions to deploy in the access policies, wherein creating the access policies includes assigning the permissions to the one or more cloud resources that are accessible within milestone access groups associated with the access policies, wherein the estimations are based on a temporal analysis of previously executed instances of IaC code, wherein the previously executed instances of IaC code are determined to have at least a predetermined degree of similarity with the instance of IaC code.

9. The computer-implemented method of claim 1, wherein the cloud environment includes a plurality of the cloud resources, wherein the execution of the instance of IaC code causes updates of a subset of the cloud resources, wherein the predetermined milestone events are based on the created access policies associated with the subset of the cloud resources and not based on the created access policies not associated with the subset of the cloud resources.

10. A computer program product, the computer program product comprising a computer readable storage medium having program instructions embodied therewith, the program instructions readable and/or executable by a processing circuit to cause the processing circuit to:

analyze a deployment plan for an instance of Infrastructure as Code (IaC) code to identify a plurality of milestones of the deployment plan, wherein the identified milestones define different periods of time that one or more cloud resources of a cloud environment will be provisioned;

estimate amounts of time that using the one or more cloud resources will take, with respect to the identified milestones, during an execution of the instance of the IaC code;

create, based on the estimated amounts of time, access policies for the identified milestones;

monitor milestone state logs during the execution of the instance of IaC code for occurrence of predetermined milestone events; and in response to a determination that a first of the predetermined milestone events has occurred, adjust first user device access permissions based on the created access policies.

11. The computer program product of claim 10, wherein the first predetermined milestone event includes a first milestone event being initiated, wherein the adjustment performed in response to the determination that the first predetermined milestone event has occurred includes: causing a first user device to be added to a first milestone access group associated with a first of the access policies.

12. The computer program product of claim 11, wherein the first user device has access to at least a first of the cloud resources as a result of being added to the first milestone access group.

13. The computer program product of claim 12, the program instructions readable and/or executable by the processing circuit to cause the processing circuit to: in response to a determination that a second of the predetermined milestone events has occurred, adjust the first user device access permissions and second user device access permissions based on the created access policies, wherein the adjustments performed in response to the determination that the second of the predetermined milestone events has occurred includes: causing a second user device to be added to a second milestone access group associated with a second of the access policies and causing the first user device to be removed from the first milestone access group.

14. The computer program product of claim 13, wherein the second user device has access to at least a second of the cloud resources as a result of being added to the second milestone access group, wherein the first user device loses access to at least the first cloud resource as a result of being removed from the first milestone access group.

15. The computer program product of claim 14 wherein the second cloud resource is dependent on the first cloud resource, wherein the dependency of the second cloud resource on the first cloud resource prevents the second cloud resource from being used until use of the first cloud resource is complete.

16. The computer program product of claim 15, wherein the cloud resources are selected from the group consisting of: object storage, access to a predetermined database, use of a virtual private cloud (VPC), and use of a data engine.

17. The computer program product of claim 10, the program instructions readable and/or executable by the processing circuit to cause the processing circuit to: determine types of permissions to deploy in the access policies, wherein creating the access policies includes assigning the permissions to the one or more cloud resources that are accessible within milestone access groups associated with the access policies, wherein the estimations are based on a temporal analysis of previously executed instances of IaC code, wherein the previously executed instances of IaC code are determined to have at least a predetermined degree of similarity with the instance of IaC code.

18. The computer program product of claim 10, wherein the cloud environment includes a plurality of the cloud resources, wherein the execution of the instance of IaC code causes updates of a subset of the cloud resources, wherein the predetermined milestone events are based on the created access policies associated with the subset of the cloud resources and not based on the created access policies not associated with the subset of the cloud resources.

19. A system, comprising:

a processor; and logic integrated with the processor, executable by the processor, or integrated with and executable by the processor, the logic being configured to:

analyze a deployment plan for an instance of Infrastructure as Code (IaC) code to identify a plurality of milestones of the deployment plan, wherein the identified milestones define different periods of time that one or more cloud resources of a cloud environment will be provisioned;

estimate amounts of time that using the one or more cloud resources will take, with respect to the identified milestones, during an execution of the instance of the IaC code;

create, based on the estimated amounts of time, access policies for the identified milestones;

monitor milestone state logs during the execution of the instance of IaC code for occurrence of predetermined milestone events; and in response to a determination that a first of the predetermined milestone events has occurred, adjust first user device access permissions based on the created access policies.

20. The system of claim 19, wherein the first predetermined milestone event includes a first milestone event being initiated, wherein the adjustment performed in response to the determination that the first predetermined milestone event has occurred includes: causing a first user device to be added to a first milestone access group associated with a first of the access policies.

* * * * *